United States Patent
Reckmann et al.

(10) Patent No.: US 10,100,580 B2
(45) Date of Patent: Oct. 16, 2018

(54) LATERAL MOTION CONTROL OF DRILL STRINGS

(71) Applicants: Hanno Reckmann, Nienhagen (DE); Thomas Dahl, Schwuelper (DE); Roland May, Celle (DE)

(72) Inventors: Hanno Reckmann, Nienhagen (DE); Thomas Dahl, Schwuelper (DE); Roland May, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 209 days.

(21) Appl. No.: 15/091,904

(22) Filed: Apr. 6, 2016

(65) Prior Publication Data

US 2017/0292327 A1    Oct. 12, 2017

(51) Int. Cl.
| | |
|---|---|
| *E21B 44/00* | (2006.01) |
| *E21B 7/24* | (2006.01) |
| *E21B 44/02* | (2006.01) |
| *E21B 12/02* | (2006.01) |
| *E21B 10/00* | (2006.01) |

(Continued)

(52) U.S. Cl.
CPC ............... *E21B 7/24* (2013.01); *E21B 10/00* (2013.01); *E21B 12/02* (2013.01); *E21B 44/02* (2013.01); *G06F 17/11* (2013.01); *G06F 17/5018* (2013.01); *E21B 45/00* (2013.01); *E21B 47/024* (2013.01); *E21B 47/06* (2013.01);
(Continued)

(58) Field of Classification Search
CPC .................................. E21B 44/00; E21B 7/24
See application file for complete search history.

(56) References Cited

U.S. PATENT DOCUMENTS

| | | |
|---|---|---|
| 4,903,245 A | 2/1990 | Close et al. |
| 5,117,926 A | 6/1992 | Worrall et al. |

(Continued)

FOREIGN PATENT DOCUMENTS

WO    2004020775 A2    3/2004

OTHER PUBLICATIONS

Arevalo, et al.; Quantification of Drillstring-Integrity-Failure Risk Using Real-Time Vibration Measurements; 2012; Society of Petroleum Engineers; 7 pages.

(Continued)

*Primary Examiner* — Kenneth L Thompson
(74) *Attorney, Agent, or Firm* — Cantor Colburn LLP (57) ABSTRACT

A method of drilling a borehole in an earth formation includes deploying a drilling assembly including a drill bit and a drill string, and performing a drilling operation according to one or more operational parameters to advance the drilling assembly through the formation, wherein performing the drilling operation includes rotating the drill bit and at least a portion of the drill string. The method also includes, during the advancing, monitoring a downhole condition, determining whether the downhole condition indicates at least one of a cuttings accumulation in the borehole and wear of a downhole component, and in response to the downhole condition indicating the cuttings accumulation or the wear, adjusting at least one operational parameter to induce or adjust an oscillating motion in the drill string, the oscillating motion causing at least one of a reduction in the cuttings accumulation and a reduction of wear of the downhole component.

20 Claims, 6 Drawing Sheets

(51) Int. Cl.
*G06F 17/50* (2006.01)
*G06F 17/11* (2006.01)
*E21B 47/12* (2012.01)
*E21B 47/06* (2012.01)
*E21B 45/00* (2006.01)
*E21B 47/024* (2006.01)

(52) U.S. Cl.
CPC .............. *E21B 47/065* (2013.01); *E21B 47/12* (2013.01); *G06F 2217/16* (2013.01)

(56) References Cited

U.S. PATENT DOCUMENTS

| | | | |
|---|---|---|---|
| 5,321,981 A | | 6/1994 | MacPherson |
| 5,454,451 A | | 10/1995 | Kawamata et al. |
| 5,704,436 A | * | 1/1998 | Smith .................... E21B 12/02 173/6 |
| 5,984,011 A | | 11/1999 | Misselbrook et al. |
| 6,206,108 B1 | | 3/2001 | MacDonald et al. |
| 7,140,452 B2 | | 11/2006 | Hutchinson |
| 7,748,474 B2 | | 7/2010 | Watkins et al. |
| 8,042,623 B2 | | 10/2011 | Quernmheim et al. |
| 8,180,614 B2 | | 5/2012 | Pabon et al. |
| 8,504,308 B2 | | 8/2013 | Li et al. |
| 8,550,183 B2 | | 10/2013 | Forster et al. |
| 8,589,136 B2 | | 11/2013 | Ertas et al. |
| 9,249,654 B2 | * | 2/2016 | Strachan ................ E21B 44/00 |
| 2004/0262041 A1 | * | 12/2004 | Krueger .............. E21B 17/1014 175/40 |
| 2007/0175662 A1 | | 8/2007 | Karacik |
| 2009/0107730 A1 | * | 4/2009 | Green .................... E21B 10/42 175/327 |
| 2010/0089647 A1 | | 4/2010 | Forster et al. |
| 2010/0258352 A1 | | 10/2010 | Aldraihem et al. |
| 2010/0270077 A1 | * | 10/2010 | Huynh .................... E21B 7/067 175/57 |
| 2011/0153217 A1 | | 6/2011 | Rodney |
| 2012/0048621 A1 | | 3/2012 | Stewart et al. |
| 2013/0092441 A1 | * | 4/2013 | Hummes ................ E21B 17/07 175/56 |
| 2013/0277110 A1 | | 10/2013 | Doris |
| 2014/0027179 A1 | * | 1/2014 | Schwefe ................ E21B 10/62 175/50 |

OTHER PUBLICATIONS

Downtown, G. C., "Challenges of Modeling Drilling System for the Purposes of Automation and Control", 2012 IFAC Workshop, Trondheim, Norway, May 31-Jun. 1, 2012; 10 pages; http://www.nt.ntnu.no/users/skoge/prost/proceedings/offshore-control-2012/papers.

Gorelik, et al., "Model and Method for a Time-Efficient Analysis of Lateral Drillstring Dynamics"; ASME Turbo Expo Jun. 15-19 2015, Montreal, Canada; 13 pages.

Heisig, et al., "Lateral Drillstring Vibrations in Extended-Reach Wells"; IADC/SPE 59235; 2000 IADC/SPE Drilling Confernece, New Orleans, LA; Feb. 23-25, 2000; 11 pages.

Schlumberger; "Power Drive Archer"; 2013; 7 pages.

Wilson, et al.; "Nonlinear Drillstring-Dynamics Modeling of Induced Vibrations in Unconventional Horizontals"; Sep. 2015 SPE Drilling & Completion; 14 pages.

International Search Report and the Written Opinion of the International Searching Authority; PCT/US2017/026115; Korean Intellectual Property Office; dated Jul. 3, 2017; 15 pages.

\* cited by examiner

LATERAL MOTION CONTROL OF DRILL STRINGS

BACKGROUND

Boreholes or wells are drilled in earth formations for exploration, and for stimulation and production of hydrocarbons. Boreholes are usually drilled along predetermined paths and the drilling of a typical borehole proceeds through various formations and stratigraphic layers. A drilling operator typically controls surface-controlled drilling operational parameters, such as the weight on bit, drilling fluid flow rates, drill string rotational rates and drilling fluid parameters (e.g., the density and viscosity of drilling fluid). During drilling, downhole components including a drill string can exhibit behaviors that have the potential to reduce drilling performance and cause problems. Such behaviors include typically undesirable motions such as stick-slip, whirl and unintended axial motion. Drilling operations are generally controlled to attempt to avoid such undesirable motions.

SUMMARY

An embodiment of a method of drilling a borehole in an earth formation includes deploying a drilling assembly at an earth formation, the drilling assembly including a drill bit and a drill string, and performing a drilling operation by the drilling assembly according to one or more operational parameters to advance the drilling assembly through the formation, wherein performing the drilling operation includes rotating the drill bit and at least a portion of the drill string. The method also includes, during the advancing, monitoring a downhole condition, determining whether the downhole condition indicates at least one of a cuttings accumulation in the borehole and wear of a downhole component, and in response to the downhole condition indicating the cuttings accumulation or the wear, adjusting at least one operational parameter to induce or adjust an oscillating motion in the drill string, the oscillating motion causing at least one of a reduction in the cuttings accumulation and a reduction of wear of the downhole component.

An embodiment of a system for drilling a borehole in an earth formation includes a drilling assembly configured to be deployed at an earth formation, the drilling assembly including a drill bit and a drill string and configured to perform a drilling operation according to one or more operational parameters to advance the drilling assembly through the formation, one or more sensors configured to monitor a downhole condition, and a processing device configured to receive measurements from the one or more sensors. The processing device is configured to perform determining whether the downhole condition indicates at least one of a cuttings accumulation in the borehole and wear of a downhole component, and in response to the downhole condition indicating the cuttings accumulation or the wear, adjusting at least one operational parameter to induce or adjust an oscillating motion in the drill string, the oscillating motion causing at least one of a reduction in the cuttings accumulation and a reduction of additional wear of the downhole component.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

There are provided systems and methods for controlling a drilling operation to induce lateral motions in a drillstring, bottomhole assembly (BHA), drill bit and/or other downhole components to improve drilling performance. An embodiment of a method includes controlling one or more drilling parameters to induce lateral and/or axial movements to, e.g., prevent or reduce wear on downhole components (e.g., a casing) and facilitate removal of cuttings. In one embodiment, the one or more drilling parameters are controlled to induce motions such as snaking and/or whirl. Such motions, which operators typically try to avoid, are intentionally induced in order to improve drilling performance.

Figure 1:
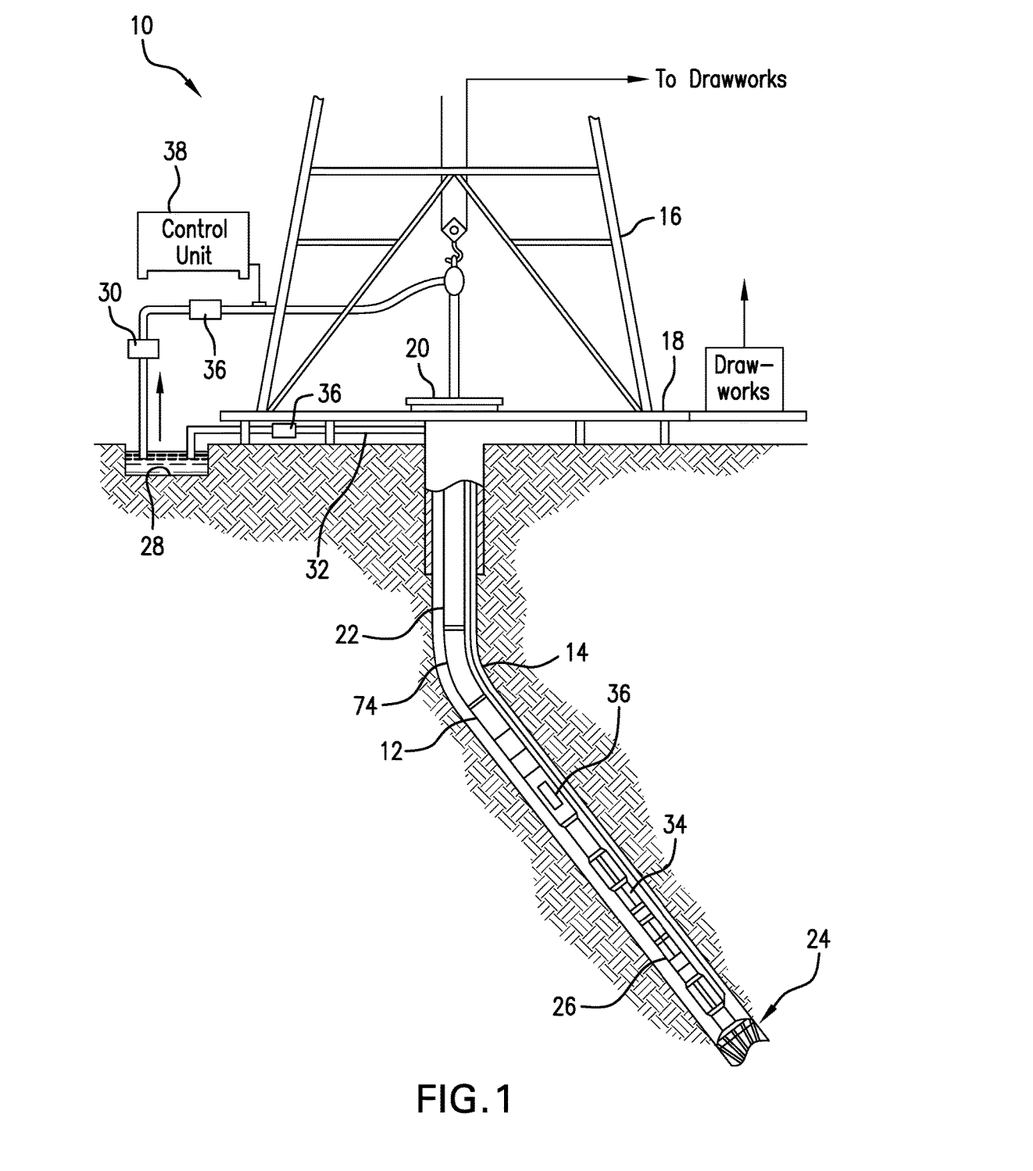
FIG. 1 is a side cross-sectional view of an embodiment of a subterranean well drilling, evaluation, exploration and/or production system.

Referring to FIG. 1, an exemplary embodiment of a well drilling, measurement, evaluation and/or production system 10 includes a drill string 12 that is shown disposed in a borehole 14 that penetrates at least one earth formation during a downhole operation, such as a drilling, measurement and/or hydrocarbon production operation. Although the borehole 14 is shown in FIG. 1 to be of constant diameter, the borehole 14 is not so limited and may be of varying diameter and/or direction (e.g., azimuth and inclination). For example, the borehole 14 may be vertical, deviated or horizontal, or may include lengths or sections having different orientations (e.g., having a vertical, deviated and/or horizontal section).

In the embodiment shown in FIG. 1, the drill string includes multiple pipe sections. However, the system 10 and borehole string 12 are not limited to the embodiments described herein, and may include any structure suitable for being lowered into a wellbore or for connecting a drill or downhole tool to the surface. For example, the drill string 12 may be configured as a coiled tubing string.

In one embodiment, the system 10 includes a derrick 16 mounted on a derrick floor 18 that supports a rotary table 20 that is rotated by a prime mover at a desired rotational rate. The drill string 12 includes one or more drill pipe sections 22 or coiled tubing, and is connected to a drill bit 24 that may be rotated via the drill string 12 or using a downhole mud motor. Drilling fluid or drilling mud is circulated through the drill string 12 and/or the wellbore 14. The system 10 may also include a bottomhole assembly (BHA) 26. In the embodiment of FIG. 1, the drill string 12 is rotated by a surface driver, but may instead or in addition be rotated by a downhole motor such as a positive displacement motor (e.g., a mud motor) or a turbine motor.

During drilling operations a suitable drilling fluid from, e.g., a mud pit 28 is circulated under pressure through the drill string 12 by one or more mud pumps 30. The drilling fluid passes into the drill string 12 and is discharged at a wellbore bottom through the drill bit 24 and/or from locations or components (e.g., nozzles, valves and/or ports) at one or more distances above the drill bit 24, and returns to the surface by advancing uphole through an annular space between the drill string 12 and the borehole wall and through a return line 32. The return fluid may include various materials, such as the drilling fluid, formation fluid (e.g., water, gas and/or oil) and solid material present in the fluid. The solid material may include, for example, material that is cut from the formation during drilling, material from cavings that are caused when borehole breakouts are created downhole, material milled from downhole components during drilling, or any other solid particles in the fluid all of which is referred to herein as "cuttings".

Various sensors and/or downhole tools may be disposed at the surface and/or in the borehole 14 to measure and/or monitor downhole conditions, or perform measurements that can be used to calculate or estimate downhole conditions. Downhole conditions may include parameters of components of the system 10 and or downhole parameters. Such parameters include, for example, parameters of the drilling fluid (e.g., flow rate, pressure, density and viscosity), environmental parameters such as downhole temperature and pressure, operating parameters such as rotational rate, weight-on-bit (WOB) and rate of penetration (ROP), and component parameters such as stress, strain and tool condition. For example, a downhole tool 34 is incorporated into the drill string 12 and includes sensors for measuring various downhole conditions, such as downhole fluid flow and/or pressure in the drill string 12 and/or in the annular space. Other downhole conditions that can be measured and/or monitored include temperature, fluid composition, orientation of downhole components, vibration and others (monitoring a condition as discussed herein includes measuring the condition at multiple times during drilling). The sensors may be discrete sensors (e.g., pressure/temperature sensors, accelerometers, strain gauges and others) arrayed along the drill string 12 and/or other components. The sensors may also be distributed sensors, for example, including optical fiber sensors such as distributed temperature sensors and distributed acoustic sensors.

The sensors and downhole tool configurations are not limited to those described herein. The sensors and/or downhole tool 34 may be configured to provide data regarding measurements of downhole conditions, communication with surface or downhole processors, as well as control functions. Such sensors can be deployed before, during or after drilling, e.g., via wireline, measurement-while-drilling ("MWD") or logging-while-drilling ("LWD") components. Exemplary conditions that could be measured or monitored include resistivity, density, porosity, permeability, acoustic properties, nuclear-magnetic resonance properties, formation pressures, properties or characteristics of the fluids downhole and other desired properties of the formation surrounding the borehole 14. The system 10 may further include a variety of other sensors and devices for determining conditions including one or more properties of the BHA (such as vibration, bending moment, acceleration, oscillations, whirl, stick-slip, etc.) and conditions such as drilling operating parameters, e.g., weight-on-bit, fluid flow rate, pressure, temperature, rate of penetration, azimuth, tool face, drill bit rotation, fluid density, fluid viscosity, solids content, etc.)

In one embodiment, the downhole tool 34, the BHA 26 and/or the sensors 36 are in communication with a surface processing unit 38. In one embodiment, the surface processing unit 38 is configured as a surface drilling control unit which controls various operational parameters such as rotational rate, weight-on-bit, fluid flow parameters, properties of solids and pumping parameters. The surface processing unit 38 may be configured to receive and process data, such as measurement data and modeling data, as well as display received and processed data. In one embodiment, the surface processing unit 38 is configured to induce and control lateral motion as described herein. Any of various transmission media and connections, such as wired connections, fiber optic connections, wireless connections and mud pulse telemetry may be utilized to facilitate communication between system components.

The downhole tool 34, BHA 26 and/or the surface processing unit 38 may include components as necessary to provide for storing and/or processing data collected from various sensors therein. Exemplary components include, without limitation, at least one processor, storage, memory, input devices, output devices and the like.

In one embodiment, the surface processing unit 38, a drilling control unit or any suitable processing device or processor is configured to control the drill string to induce axial or lateral motions in order to facilitate drilling and address various problems that can arise downhole. One such problem is wear on the drill string, BHA and/or other components due to contact between the components and a borehole casing or a borehole wall. Another problem, in the instance of a cased borehole or borehole section, is wear of the casing due to contact with the drill string or other components during drilling. Yet another problem is the build-up or accumulation of cuttings and other material in the borehole, which can cause reduction in drilling efficiency, wear or damage to components, increased borehole fluid flow rates and other problems.

The processing device, either autonomously or in conjunction with a human operator, is configured to control drilling parameters such as weight-on-bit and rotational rate to induce oscillating lateral and/or axial motions to address one or more of the above problems. Dynamic effects in the borehole lead to motions including lateral motions or vibrations, such as "snaking" motions and backward whirl. As described herein, "lateral motion" refers to motion that has at least a component in a direction perpendicular to a longitudinal axis of a drill string or a borehole. Drilling parameters are controlled to induce one or more of these motions to, e.g., to improve hole cleaning and reduce or minimize casing wear. In one embodiment, one or more modeling techniques are employed in conjunction with sensors (e.g., distributed sensors) to predict whirl and snaking, and predict or estimate other information, such as the optimum conditions for cuttings transport and optimized drilling parameters (set by a human driller or automated). This information can be used individually or according to arbitrary combinations.

Figure 2:
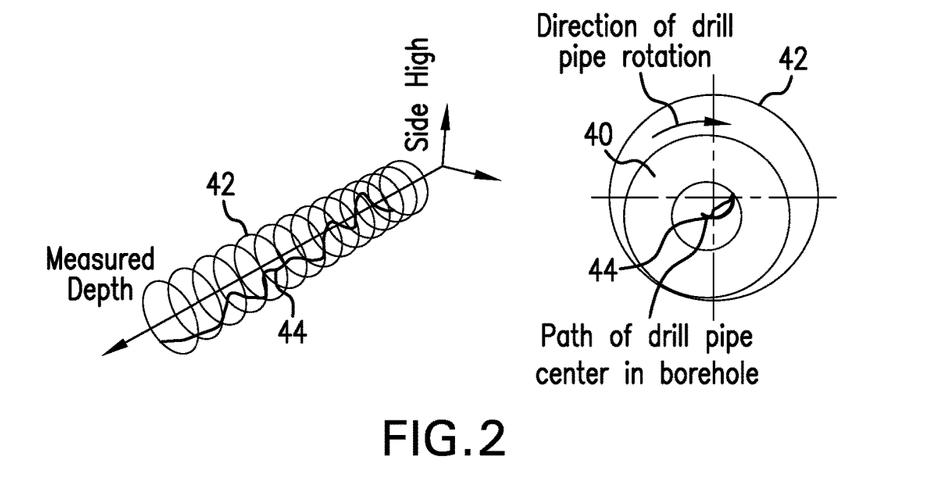
FIG. 2 depicts an example of snaking motion of a drill string.

Snaking occurs when the rotational rate of the drill string exceeds a critical threshold and the drill string starts to "snake", sliding sideways or laterally up and down the borehole wall. This oscillating snaking motion can lead to significant wear on the drill string and/or on a casing section, but has been found to be controllable as discussed in embodiments herein, for example by restricting the magnitude and/or duration of the snaking motion. FIG. 2 shows a perspective view and a cross-sectional view of an example of snaking motion of a drill string. In this example, a drill string including drill pipe 40 is disposed in a deviated borehole 42. As shown, in a deviated borehole, the drill pipe 40 tends to lie on the low side of the hole while rotating. FIG. 2 also shows a path 44 of the drill pipe 40 typical of a snaking motion. Due to lateral motion, the drill pipe 40 moves laterally along a surface of the borehole wall (or a casing if present).

Figure 3:
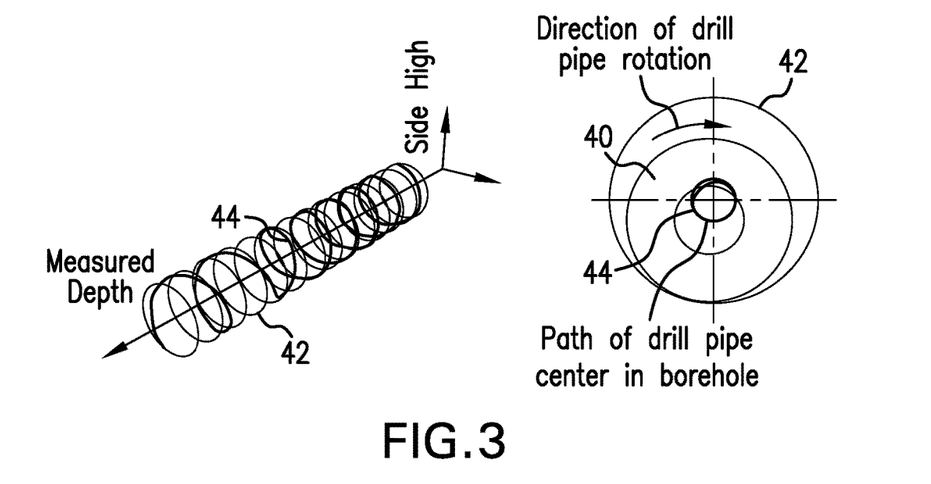
FIG. 3 depicts an example of drill string whirl.

When the rotational rate of the drill string is increased beyond the rotational rate causing snaking, the drill string will in time start to whirl, which can cause significant and often severe damage to a BHA or other downhole component(s) within a relatively short period of time. FIG. 3 shows a perspective and cross-sectional view of an example of whirling motion. As shown, the snaking motion can evolve into a whirling motion, in which the drill pipe follows a generally helical path 44.

As indicated above, snaking or whirling movement of the drill string and/or other components may be induced to prevent cuttings bed accumulation and/or to initiate destruction of stationary cutting beds. The dynamic behavior of the drill string can be controlled to facilitate cuttings transport and stationary bed removal. For example, in a deviated hole, cuttings can build up, creating a cuttings bed on the low side of the borehole (i.e., the side having a greater vertical depth). Lateral motions such as snaking and whirling can provide mechanical agitation of the cuttings bed on the low side of the hole, and can also expose the cuttings to higher fluid velocities when the drill string portion moves laterally to the high side of the hole. Another effect from such a string motion may be the active break-up of fluid gels bonding the cuttings to the bed. With the snaking or whirling motion, a broad area of the casing or borehole cross-section will be reached by the string instead of rotating at a single position.

Figure 4A:
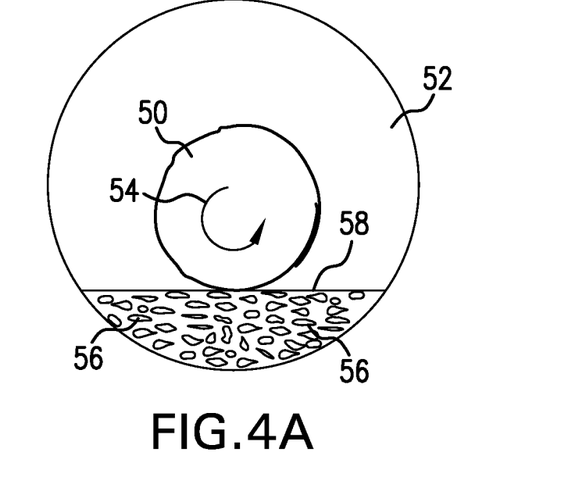
FIGS. 4A and 4B depict an example of an effect of control of lateral motion to reduce or prevent cuttings build-up.
Figure 4B:
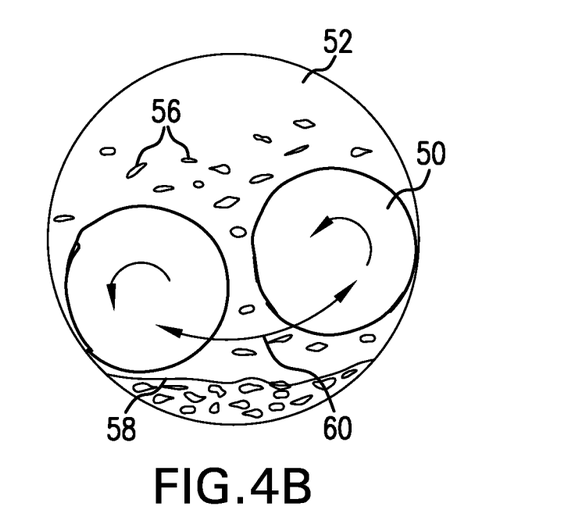

This benefit of preventing cuttings accumulation and/or hole cleaning using increased lateral motion is illustrated in FIGS. 4A and 4B. FIG. 4A shows a rotating drill string 50 under steady state operation in a borehole 52, which may be a cased or open hole section or borehole. The drill string 50 rotates in a direction shown by arrow 54. As a result of drilling (e.g., in a deviated or horizontal path), cuttings 56 produced by drilling can form a cuttings bed 58. As shown in FIG. 4B, the drill string 50 is operated to cause a snaking motion (shown by a path 60) that causes the cuttings bed 58 to at least partially break up, allowing cuttings to be removed to the surface. Thus, causing a snaking motion in the drill string 50 can result in reducing or breaking up cuttings beds and/or preventing cuttings beds from forming or growing.

Inducement and control of lateral motion may also be used to control wear and prevent excessive wear of a casing and/or downhole component (e.g., a portion of the drill string). For example, inducement of snaking movement can be used to prevent local wear concentration by causing the drill string to vibrate or oscillate along a larger area of the casing or borehole wall.

Figure 5A:
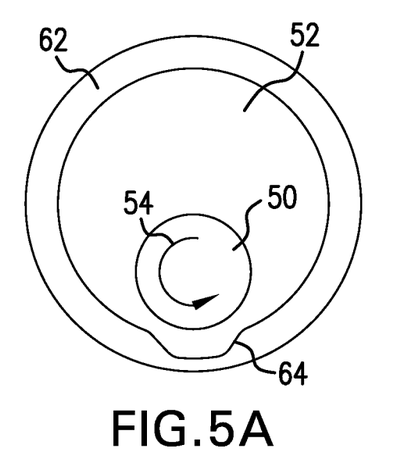
FIGS. 5A and 5B depict an example of an effect of control of lateral motion to reduce or prevent component wear.
Figure 5B:
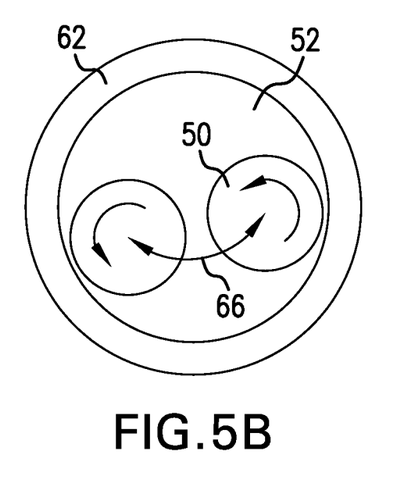

This benefit is illustrated by an example shown in FIGS. 5A and 5B, which demonstrates the potential to reduce wear by increasing lateral motion. In this example, the rotating drill string 50 under steady state operation contacts a borehole casing 62 (or the borehole wall in an open hole section) over a relatively small area, which can produce a concentration of wear on a portion of the casing. A potential result of this is a groove 64 worn into the casing or borehole, as shown in FIG. 5A. To avoid this, as shown in FIG. 5B, the drill string 50 is operated to cause a snaking motion (shown by a path 66) that results in a larger area of contact and thereby spreads the wear over a larger area to avoid the creation of the groove or other wear concentration. With the snaking vibration, a broad area of the casing will be touched by the string instead of the creation of a small wear groove.

Figure 6:
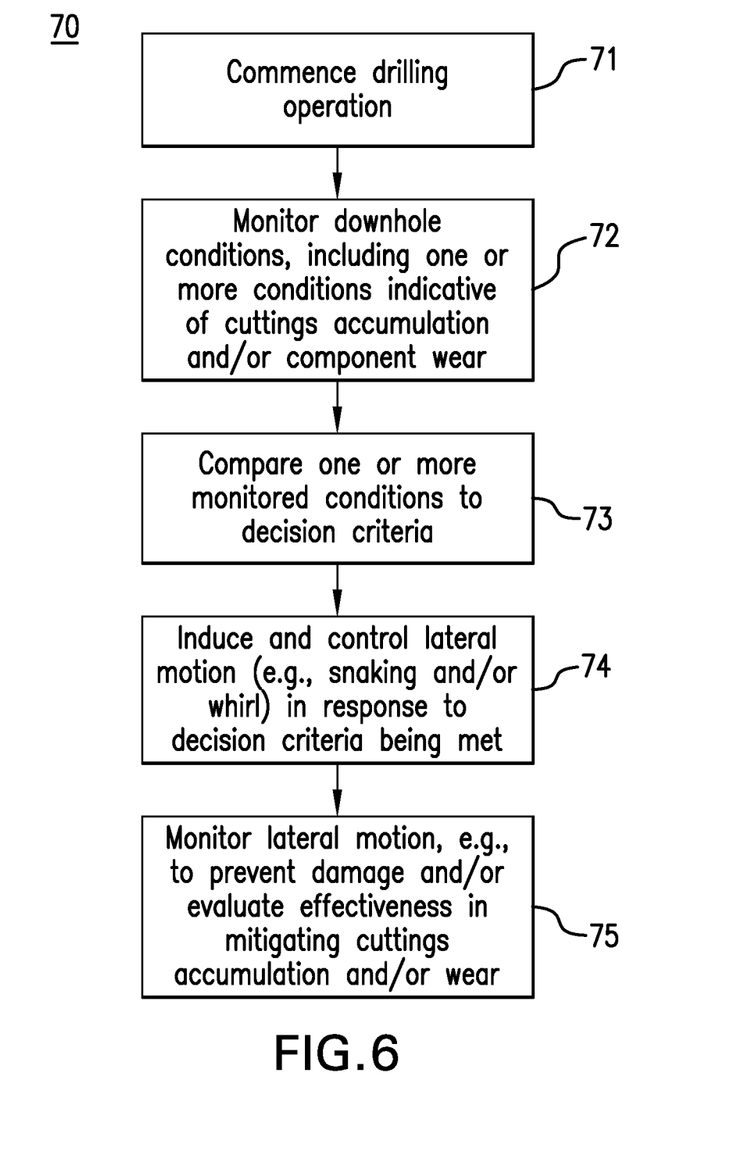
FIG. 6 is a flow diagram illustrating an embodiment of a method of drilling a borehole and controlling the borehole to induce lateral motions.

FIG. 6 illustrates a method 70 of drilling a wellbore, which includes controlling operational parameters of a drilling system, monitoring downhole conditions, and/or adjusting operational parameters to induce lateral motion of one or more downhole components. The method 70 is used in conjunction with the system 10 and/or the surface processing unit 38, although the method 70 may be utilized in conjunction with any suitable combination of sensing devices and processors. The method 70 includes one or more stages 71-75. In one embodiment, the method 70 includes the execution of all of stages 71-75 in the order described. However, certain stages may be omitted, stages may be added, or the order of the stages changed.

In the first stage 71, a drilling operation is commenced by deploying a drilling assembly at an earth formation. The drilling assembly includes at least a drill bit and a drill string, and may also include additional components, such as a BHA, sensing devices, stabilizers, drill collars and others. It is noted that, although embodiments are discussed herein for inducing and controlling lateral motion of the drill string, the embodiments are also applicable to controlling the motion of other components of the drilling assembly, such as a BHA. In addition, references to control of motion of the drill string are understood to include control of the motion of the entire drill string or control of the motion of one or more selected sections or lengths of the drill string.

The drilling operation is performed by rotating the drill bit using a surface driver such as a top drive or rotary table, or a downhole driver such as a mud motor. During drilling, a drilling fluid is injected and circulated in the borehole, and borehole fluid is returned to the surface. Borehole fluid may be made up of various materials, including the drilling fluid, formation fluid and cuttings. Various operational parameters are controlled during drilling, such as weight-on-bit, rotational rate of the driver, rate of penetration, inclination, and fluid parameters such as flow rate, pressure and fluid composition. The borehole may drilled vertically and/or steered to follow a deviated borehole path.

In the second stage 72, one or more downhole conditions are monitored to evaluate the drilling operation, monitor downhole conditions and control operational parameters. Examples of such conditions include borehole temperature, downhole pressure, borehole fluid composition, rotational rate of downhole components, weight, torque, axial movement and lateral movement of downhole components (e.g. vibrations), and properties of the formation to be drilled through.

In one embodiment, the monitored conditions include conditions that are indicative of a build-up or accumulation of cuttings in the borehole and/or indicative of excessive or undesirable amounts of wear on a casing or on other components. For example, changes in caliper measurements (e.g., reductions in the measured borehole diameter), drag, cuttings concentrations measured at the surface, pressure changes and/or torque changes may be indicative of cuttings accumulation. Conditions such as metal content in borehole fluid, changes in caliper measurements, reductions in casing thickness, acoustic measurements and/or changes in torque may be indicative of wear.

For monitoring cuttings, a condition may be a cuttings distribution in the borehole fluid, which can be estimated periodically, as desired or in real time. Properties of the cuttings distribution include, e.g., rock type, cutting size, cutting shape and volume of cuttings. The properties can be estimated by sampling at the surface or sampling downhole.

Sensor devices may be disposed at selected locations along the drill string to perform measurements at one or more locations along the drill string. For example, one or more sensors (e.g., the sensors 36) include a caliper tool to measure the build-up, existence and/or reduction of cuttings beds. The caliper tool measures a distance defined by an annular region, which can be correlated to build-up.

Sensors at or near the surface and/or arrayed along the drill string may be used to measure borehole fluid pressure and/or flow rate, which can be correlated or associated with cuttings build-up. For example, at least two pressure sensors for differential pressure can measure the build-up, existence or effective reduction of cutting beds based on the differential pressure and/or the change in differential pressure. In another example, torque measurements are performed at multiple times, and an amount of torque is correlated with cuttings build-up or accumulation (i.e., an amount of cuttings that has settled or accumulated in the borehole). Trends in torque measurements can be associated with changes in cuttings accumulation, e.g., increased torque can be correlated with a corresponding increase in cuttings accumulation.

Various conditions may be monitored to estimate an amount of wear on a downhole component and/or to determine whether an unacceptable amount of wear has the potential to develop. For example, the caliper tool is used to measure the distance to a casing or borehole wall to detect and measure casing wear, e.g., to detect and/or determine the extent of a groove or other discontinuity that has developed as a result of wear.

In another example, the position and/or motion of the drill string at various locations is estimated based on sensors such as inclination sensors, bending sensors or strain sensors. Measurements from such sensors may be input to a model or otherwise analyzed to determine an extent of the lateral motion, which may be an indication that excessive wear is occurring. For example, if the drill string has little to no lateral motion but is or may contact the borehole wall or the casing, excessive wear may occur.

In the third stage 73, the monitored conditions are compared to decision criteria to determine whether lateral motion is to be induced. For example, measurements associated with cutting accumulation and/or component wear are compared to decision criteria. In one embodiment, real time measurements from sensors arrayed along the string are analyzed in real time with respect to the decision criteria. The decision criteria may be threshold values determined by prior measurements or information and/or determined by modeling, but are not so limited.

For example, the measurement of an amount of cuttings that has built up is measured by the caliper tool and compared to a threshold amount that is associated with the onset or potential onset of problems (e.g., drilling efficiency reduction, excessive wear or vibration, fluid flow reduction). The amount of cuttings may also be monitored over time, and the rate of change or accumulation of cuttings is compared to some threshold rate. In another example, the accumulation of cuttings is estimated or predicted based on measurements such as borehole fluid flow rate or borehole fluid pressure. The fluid flow rate or pressure (and/or the rate of change of flow rate or pressure) is compared to a threshold value.

Estimation of the amount of cuttings or cuttings accumulation may be performed by sensors that measure fluid pressure, and the fluid pressure or an increase in fluid pressure is compared to a threshold amount that is indicative of cuttings build-up to an undesired degree. The threshold pressure can be selected based on prior knowledge, previous measurements, measurements taken from similar wells or formation, and/or from a model. For example, differential pressure from at least two pressure sensors is compared to a threshold pressure. In another example, the amount of cuttings returning to surface can be measured directly and compared to an expected amount to determine an amount of the cuttings that has remained in the borehole.

Various conditions may be monitored to estimate an amount of wear on a downhole component and/or to determine whether an unacceptable amount of wear has the potential to develop. For example, the caliper tool is used to measure the distance to a casing or borehole wall to detect and measure casing wear, e.g., to detect and/or determine the extent of a groove or other discontinuity that has developed as a result of wear. Other measurements such as measurements of casing wall thickness and acoustic standoff measurements may be used to detect and measure casing wear. The metal or solids content of borehole fluid may be measured and/or monitored, and the type and/or amount of metal can be used to indicate an amount of wear. For example, the casing and/or other component is made from a metal such as steel, and the amount of metal (e.g., steel) in the borehole fluid detected during drilling is correlated (e.g., by empirical data or modeling) to an amount of wear.

In another example, the measured position and/or motion of the drill string are analyzed to determine an extent of lateral motion of the drill string. The extent is compared to a desired extent of lateral motion that is considered to reduce or prevent wear. The position and/or motion may be analyzed with other measurement to determine whether the amount of lateral motion is sufficient. For example, vibration measurements and/or analysis of borehole fluid are used to determine whether the drill string is rubbing against the casing or borehole wall.

In another example, casing and/or drillstring material is inspected at the surface to determine whether wear is occurring and the severity of such wear, which may be used to determine whether lateral motion should be induced or increased.

In one embodiment, a model of the drill string is accessed or generated that estimates and predicts behaviors of the drill string in response to various drilling parameters and downhole conditions. It is noted that the generation or accessing of a model may be performed before drilling is commenced and/or at any desired time during drilling. Real time comparison of sensor data with models may be performed to adjust and adapt the model structure or the model parameters.

The model may be used to estimate or predict the build-up or accumulation of cuttings or existence/severity of wear based on inputted measurements and operational parameters. For example, a fluid dynamic and/or fluid structure interaction model is used to generate drilling and fluid parameter optimization (or stability) maps of forces acting on fluid particles as a function of fluid flow and string motion.

In the fourth stage 74, in response to a monitored condition exceeding a threshold or meeting some other criteria, lateral motion such as snaking and/or whirl is induced. One or more operational parameters may be adjusted, either automatically by the processing device, manually by an operator, or by the processing device in conjunction with an operator. For example, if criteria are met, the processing device automatically adjusts an operational parameter such as rotational rate to cause snaking and/or whirl. In another example, the processing device displays results of monitoring of selected criteria to allow an operator to adjust operational parameters as desired. In yet another example, the processing device generates an alarm (e.g., a visual alarm such as a red light or an audible alarm.

The decision as to whether snaking motion should be induced and/or adjustment of operational parameters can be accomplished using various levels of automation. The processing device may act fully autonomously, or act in conjunction with a human user according to different levels of automation. The following table describes an example of a characterization of automation levels, denoted as levels 1-10, where level 10 represents the highest level of automation and level 1 represents no automation at all. Monitoring and/or control of snaking motion may be performed as described herein with one or more of the following levels of automation:

| Automation Level | Description |
| --- | --- |
| 1 | The processing device offers no assistance; a human must take all decisions and actions. |
| 2 | The processing device offers a complete set of decision/action alternatives, or |
| 3 | narrows the set down to a few, or |
| 4 | suggests one alternative, and |
| 5 | executes that suggestion if the human approves, or |
| 6 | allows the human a restricted time to veto before automatic execution, or |
| 7 | executes automatically, then necessarily informs humans, and |
| 8 | Informs the human only if asked, or |
| 9 | Informs the human only if it, the processing device, decides to. |
| 10 | The processing device decides everything and acts autonomously, ignoring the human. |

The processing device may display adjustment options to a user to allow the user to select an option that is executed by the processing device. For example, a surface display is connected to the processing device, which includes features for status display and alarm generation and display based on defined conditions. Based on input measurements and models, the processing device can react to conditions indicative of a critical situation by generating an alarm with advice how to mitigate the critical situation. This level of automation may correspond to levels 3-4.

The processing device may determine whether a monitored condition indicates a cuttings accumulation and/or excessive wear using a number of techniques. For example, the processing device can compare a monitored condition (e.g., fluid pressure or caliper measurements) to empirical data correlating the condition to cuttings accumulation and/or wear. In another example, the monitored condition is associated with cuttings and/or wear using one or more of various modeling techniques. Examples of modeling techniques include using a look-up table, a database, a physical model, one or more mathematical equations, a finite element model, and/or a finite difference model to describe the behavior of the drill string.

In one embodiment, control of the drill string is performed in conjunction with a mathematical drill string model. The model may be any suitable model, function or mathematical relationship that describes the motion of the drill string in response to various operational parameters and downhole conditions. In one embodiment, the model estimates or predicts whether and when snaking motion and/or whirl is to result from some combination of operational parameters and downhole condition values.

Any suitable model may be used to monitor and control drill string motion. Examples of models include mathematical algorithms, finite difference and/or finite element models, physical models (e.g., of a borehole string, borehole and/or formation region), tables and databases.

An embodiment of a model is a linear analytical model that calculates natural frequencies and mode shapes based on drill string properties such as mass and radius, borehole properties such as borehole radius, and operational parameters such as WOB. Using an equation of motion, resonance frequencies of the lateral vibration of a drill string are calculated.

An example of an equation of motion that can be used as part of the model follows:

$$\mu\ddot{\theta} + \frac{q}{r}\theta + F\theta'' + EI\theta'''' = 0,$$

where q is the distributed buoyant weight of the section of the drill string being modeled, $\mu$ is the distributed mass of the drill string section, and r is the radial clearance between the drill string section and the borehole. F is the axial force and/or weight on bit, and EI is the bending stiffness of the drill string section. $\theta$ is the angular deflection of the drill string section, $\ddot{\theta}$ is the second derivative of $\theta$ with respect to time, $\theta''$ is the second derivative of $\theta$ with respect to arc-length of the drill string section, and $\theta''''$ is the fourth derivative of $\theta$ with respect to arc-length.

Another embodiment of a suitable model is a finite element model that models the drill string and/or additional components (e.g., the BHA, drill bit, drill collars, stabilizers, casing and others) as geometric elements, and simulates forces and conditions on the drill string based on operational parameters such as WOB and rotational rate, and measurements such as strain measurements, fluid flow measurements, vibration measurements and others. The elements are given degrees of freedom, and equations of motion are used to calculate behavior of the drill string, including steady state, snaking and whirl.

The model may further be used to identify the lowest resonance frequency and associated operational parameters at which snaking begins to occur, and may also be used to identify the resonance frequency at which snaking transitions into whirl. In this way, operational parameters can be correlated with different lateral motion behavior and thus controlled to induce snaking and/or whirl, maintain a desired amplitude of snaking and/or whirl motion, and avoid developing whirl if desired.

The model may be used to estimate the lateral motion, and may also be used to identify conditions in which snaking will or could develop into whirl. In one embodiment, the model is used to create drilling parameter stability maps that separates drill string behavior between whirl, snaking and stable drilling. The processing device may monitor the drill string using the model to compare drill string behavior and/or operational parameters and determine when and at what conditions a transition between snaking and whirl will occur.

Based on the model and/or stability map, lateral motion may be induced and maintained for a selected period of time sufficient to reduce an amount of cuttings (e.g., reduce or eliminate a cuttings bed). The lateral motion may also be maintained in order to reduce or prevent casing wear.

In one embodiment, the amplitude of oscillation associated with the snaking motion is maintained to within selected limits. For example, based on the stability map, the rotational rate and/or other operational parameter are controlled to keep the amplitude within a range sufficient to remove cuttings and/or reduce wear while avoiding the transition into whirl. The operational parameter(s) can be controlled (or suggested to an operator) to get as close as possible to the stability border between snaking and whirl. Models predicting the snaking amplitude can thus be used for parameter tuning to maximize snaking vibration. If whirl in the string section is desired, whirl can be realized and supported with models and stability maps.

The model may also be used to estimate whether and/or how quickly whirl will lead to fatigue, overload damage or other problems. This is useful in allowing the processing device to maintain whirl to, e.g., clean the borehole, and limit the amount of time whirl occurs. This amount of time may be different depending on the operational parameters, characteristics of the drill string and/or characteristics of the borehole. For example, for a section of the borehole that is vertical or has a smaller deviation from vertical than other sections, or a section in which the string section has a bigger clearance, whirl may be less dangerous and thus can be maintained for a longer period of time.

In the fifth stage 75, the lateral motion is monitored to determine the effectiveness of the motion in managing cuttings and/or preventing wear.

In one example, a change in caliper measurements and/or reduction in pressure can be correlated with a corresponding reduction in cuttings accumulation. For example, a measured radius of the borehole is correlated to an amount or thickness of a cuttings bed or other accumulation, and the difference between the measured radius at multiple times is correlated with a change in the amount of cuttings. A decrease in the measured radius can be correlated with an accumulation or increase in the amount of cuttings, and an increase in the measured radius can be correlated with a decrease in the amount of cuttings. Likewise, increases in flow rate and/or changes in pressure may be estimated to indicate that the cuttings accumulation (e.g., a cuttings bed) has been reduced.

In one embodiment, the processing device continuously or periodically calculates the drill string motion by inputting measurements and/or operational parameter values. In this embodiment, the processing device determines whether snaking motion or whirl is occurring, and may also determine the path and/or extent of the snaking motion or whirl.

In one embodiment, the processing device utilizes a closed loop control process or algorithm that includes receiving continuous (i.e., at each measurement or sample time of a sensor) or periodic measurements, comparing the measurements to values indicative of cuttings accumulation or wear, and automatically adjusting operational parameters to induce lateral motion. The closed loop control may also include receiving measurements while the lateral motion is occurring, and controlling the operational parameters to keep the lateral motion within selected limits (e.g., to avoid whirl or restrict an amount of time during which whirl is maintained). The closed loop control may further include monitoring to determine whether cuttings accumulation or wear is within acceptable limits, and returning the drill string to normal operation (i.e., in which snaking or whirl is not being intentionally induced).

In one embodiment, one or more actuators are included with the drill string in order to control motion of the drill string and induce lateral motions. For example, one or more devices can be positioned at selected locations along the drill string (e.g., at connection points between drill pipe segments) to change properties of the drill string, e.g., inertial properties, rotational rate and/or forces such as torque. The actuators, in one embodiment are used to change the properties according to a drill string model in order to induce and control lateral motion.

Figure 7:
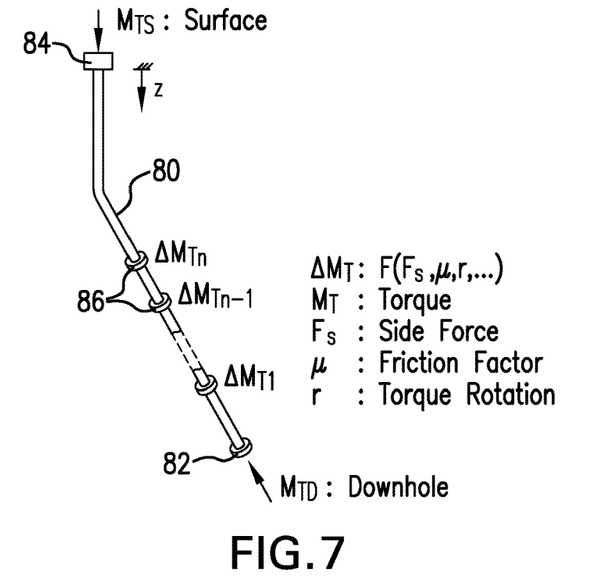
FIG. 7 depicts an embodiment of a drilling system including devices configured to control behavior of a drill string by controlling applied torque.

FIG. 7 shows an example of devices disposed at a drill string to control movement downhole and induce lateral motions. In this example, a drill string 80 is connected to a drill bit 82 and surface equipment 84 that includes a rotary table, top drive or other driver to rotate the drill string 80. One or more torque application devices 86 are coupled to the drill string 80 at one or more locations along the drill string 80. The devices 86 are arrayed axially in this example at a plurality of locations, although any number and configuration of devices may be used.

Examples of torque application devices include devices that change the torque radius r (e.g., expandable or adjustable stabilizers), and devices that change a static system with respect to the location of side forces Fs being introduced (e.g. expandable or adjustable stabilizers). Other examples of torque application devices include devices that change frictional interfaces (e.g., multi-interface bearing subs, controllable lubrication or adjustable break subs), and devices that changing torque transfer (e.g., gears or clutches).

The devices are configured to add or reduce the torque $M_T$ by introducing a differential torque $\Delta M_T$ at one or more locations at the drill string. The differential torque is provided in addition to torque $M_{TS}$ supplied at the surface and downhole torque $M_{TD}$. In this example, a number of devices are arrayed along the drill string at desired locations. Operation of the devices may be performed in conjunction with a drill string model coupled with all degrees of freedom (e.g., rotation and displacement) that describes the behavior of the drill string in response to various conditions, including forces such as torque incident at various locations of the drill string.

As shown in FIG. 7, the differential torque is a function of multiple conditions, including a side force $F_S$, radius r, and a friction factor $\mu$ that represents frictional forces resulting from interaction between the drill string and the borehole wall or casing. The differential torque may be applied via any number of devices. For example, a device such as a stabilizer is disposed at one or more locations and configured to be actuated to apply the side force $F_S$. An injection device may be employed at the surface and/or at one or more downhole locations to inject friction reducers or other materials that influence mud properties to change friction at contact points.

Figure 8:
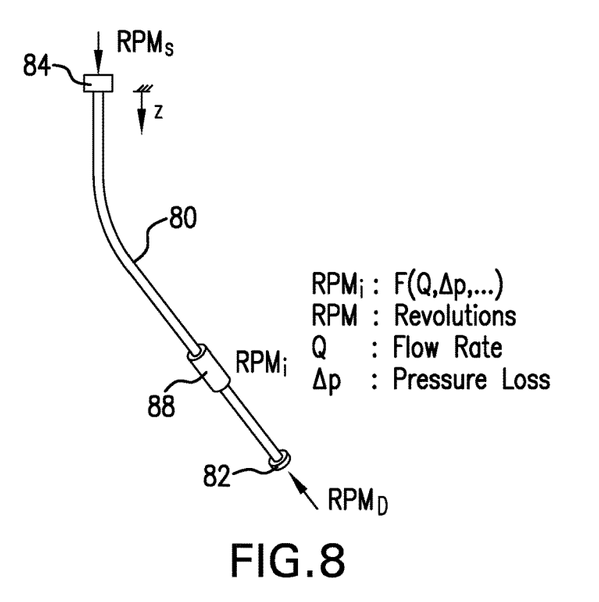
FIG. 8 depicts an embodiment of a drilling system including devices configured to control behavior of a drill string by controlling rotation.

FIG. 8 show examples of devices 88 configured to change the rotation of the drill string at various locations. The rotation is denoted in FIG. 8 as RPM (revolutions per minute), and can be represented as a function of flow rate Q and change in pressure $\Delta p$. In this example, the drill string may be represented by a model having one degree of freedom (e.g., rotation).

The flow rate and/or differential pressure can be controlled by one or more of the devices 88. For example, a hydraulic or electric motor is coupled to the drill string to control the rotation. Other devices for controlling rotation include clutch and gear devices.

Set forth below are some embodiments of the foregoing disclosure:

Embodiment 1: A method of drilling a borehole in an earth formation, comprising: deploying a drilling assembly at an earth formation, the drilling assembly including a drill bit and a drill string; performing a drilling operation by the drilling assembly according to one or more operational parameters to advance the drilling assembly through the formation, wherein performing the drilling operation includes rotating the drill bit and at least a portion of the drill string; during the advancing, monitoring a downhole condition; determining whether the downhole condition indicates at least one of a cuttings accumulation in the borehole and wear of a downhole component; and in response to the downhole condition indicating the cuttings accumulation or the wear, adjusting at least one operational parameter to induce or adjust an oscillating motion in the drill string, the oscillating motion causing at least one of a reduction in the cuttings accumulation and a reduction of wear of the downhole component.

Embodiment 2: The method of embodiment 1, wherein the oscillating motion includes at least one of a snaking motion of the drill string and a whirl motion of the drill string.

Embodiment 3: The method of embodiment 1, wherein inducing the oscillating motion includes determining a required value range of one or more of the operational parameters that is sufficient to cause the drill string to exhibit the oscillating motion.

Embodiment 4: The method of embodiment 3, wherein determining the required value range is based on a model of the drill string.

Embodiment 5: The method of embodiment 4, wherein determining the required value range of the one or more of the operational parameters includes identifying a first operational parameter value sufficient to cause a snaking motion of the drill string and identifying a second operational parameter value sufficient to cause the snaking motion to transition to a whirl motion.

Embodiment 6: The method of embodiment 5, wherein inducing the oscillating motion includes controlling at least one operational parameter to maintain the rotational rate of the drill string between the first operational parameter value and the second operational parameter value.

Embodiment 7: The method of embodiment 1, wherein monitoring includes estimating an amount of cuttings in the borehole, and inducing includes adjusting one or more of the operational parameters in response to the amount of cuttings.

Embodiment 8: The method of embodiment 1, wherein inducing includes adjusting one or more of the operational parameters to increase an area of contact between the downhole component and the borehole.

Embodiment 9: The method of embodiment 1, wherein inducing includes actuating one or more downhole devices to modify a behavior of the drill string and cause the drill string to exhibit the oscillating motion.

Embodiment 10: The method of embodiment 9, wherein the one or more downhole devices are configured to adjust at least one of an amount of torque applied to the drill string and a rotational rate of the drill string.

Embodiment 11: A system for drilling a borehole in an earth formation, comprising: a drilling assembly configured to be deployed at an earth formation, the drilling assembly including a drill bit and a drill string and configured to perform a drilling operation according to one or more operational parameters to advance the drilling assembly through the formation; one or more sensors configured to monitor a downhole condition; and a processing device configured to receive measurements from the one or more sensors and perform: determining whether the downhole condition indicates at least one of a cuttings accumulation in the borehole and wear of a downhole component; and in response to the downhole condition indicating the cuttings accumulation or the wear, adjusting at least one operational parameter to induce or adjust an oscillating motion in the drill string, the oscillating motion causing at least one of a reduction in the cuttings accumulation and a reduction of additional wear of the downhole component.

Embodiment 12: The system of embodiment 11, wherein the oscillating motion includes at least one of a snaking motion of the drill string and a whirl motion of the drill string.

Embodiment 13: The system of embodiment 11, wherein inducing the oscillating motion includes determining a required value range of one or more of the operational parameters that is sufficient to cause the drill string to exhibit the oscillating motion.

Embodiment 14: The system of embodiment 13, wherein determining the required value range is based on a model of the drill string.

Embodiment 15: The system of embodiment 14, wherein determining the required value range of the one or more of the operational parameters includes identifying a first operational parameter value sufficient to cause a snaking motion of the drill string and identifying a second operational parameter value sufficient to cause the snaking motion to transition to a whirl motion.

Embodiment 16: The system of embodiment 15, wherein inducing the oscillating motion includes controlling at least one operational parameter to maintain the rotational rate of the drill string between the first operational parameter value and the second operational parameter value.

Embodiment 17: The system of embodiment 11, wherein monitoring includes estimating an amount of cuttings in the borehole, and inducing includes adjusting one or more of the operational parameters in response to the amount of cuttings.

Embodiment 18: The system of embodiment 11, wherein inducing includes adjusting one or more of the operational parameters to increase an area of contact between the downhole component and the borehole.

Embodiment 19: The system of embodiment 11, wherein inducing includes actuating one or more downhole devices to modify a behavior of the drill string and cause the drill string to exhibit the oscillating motion.

Embodiment 20: The system of embodiment 19, wherein the one or more downhole devices are configured to adjust at least one of an amount of torque applied to the drill string and a rotational rate of the drill string.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of drilling a borehole in an earth formation, comprising:
    deploying a drilling assembly at an earth formation, the drilling assembly including a drill bit and a drill string;
    performing a drilling operation by the drilling assembly according to one or more operational parameters to advance the drilling assembly through the formation, wherein performing the drilling operation includes rotating the drill bit and at least a portion of the drill string;
    during the advancing, monitoring a downhole condition;
    determining whether the downhole condition indicates at least one of a cuttings accumulation in the borehole and wear of a downhole component; and
    in response to the downhole condition indicating the cuttings accumulation or the wear, adjusting at least one operational parameter to induce or adjust an oscillating motion, the oscillating motion being a snaking motion in the drill string, the snaking motion causing at least one of a reduction in the cuttings accumulation and a reduction of wear of the downhole component.

2. The method of claim 1, wherein the oscillating motion further includes a whirl motion of the drill string.

3. The method of claim 1, wherein inducing the oscillating motion includes determining a required value range of one or more of the operational parameters that is sufficient to cause the drill string to exhibit the oscillating motion.

4. The method of claim 3, wherein determining the required value range is based on a model of the drill string.

5. The method of claim 4, wherein determining the required value range of the one or more of the operational parameters includes identifying a first operational parameter value sufficient to cause a snaking motion of the drill string and identifying a second operational parameter value sufficient to cause the snaking motion to transition to a whirl motion.

6. The method of claim 5, wherein inducing the oscillating motion includes controlling at least one operational parameter to maintain the rotational rate of the drill string between the first operational parameter value and the second operational parameter value.

7. The method of claim 1, wherein monitoring includes estimating an amount of cuttings in the borehole, and inducing includes adjusting one or more of the operational parameters in response to the amount of cuttings.

8. The method of claim 1, wherein inducing includes adjusting one or more of the operational parameters to increase an area of contact between the downhole component and the borehole.

9. The method of claim 1, wherein inducing includes actuating one or more downhole devices to modify a behavior of the drill string and cause the drill string to exhibit the oscillating motion.

10. The method of claim 9, wherein the one or more downhole devices are configured to adjust at least one of an amount of torque applied to the drill string and a rotational rate of the drill string.

11. A system for drilling a borehole in an earth formation, comprising:
    a drilling assembly configured to be deployed at an earth formation, the drilling assembly including a drill bit and a drill string and configured to perform a drilling operation according to one or more operational parameters to advance the drilling assembly through the formation;
    one or more sensors configured to monitor a downhole condition; and
    a processing device configured to receive measurements from the one or more sensors and perform:
        determining whether the downhole condition indicates at least one of a cuttings accumulation in the borehole and wear of a downhole component; and
        in response to the downhole condition indicating the cuttings accumulation or the wear, adjusting at least one operational parameter to induce or adjust an oscillating motion, the oscillating motion being a snaking motion in the drill string, the snaking motion causing at least one of a reduction in the cuttings accumulation and a reduction of additional wear of the downhole component.

12. The system of claim 11, wherein the oscillating motion further includes a whirl motion of the drill string.

13. The system of claim 11, wherein inducing the oscillating motion includes determining a required value range of one or more of the operational parameters that is sufficient to cause the drill string to exhibit the oscillating motion.

14. The system of claim 13, wherein determining the required value range is based on a model of the drill string.

15. The system of claim 14, wherein determining the required value range of the one or more of the operational parameters includes identifying a first operational parameter value sufficient to cause a snaking motion of the drill string and identifying a second operational parameter value sufficient to cause the snaking motion to transition to a whirl motion.

16. The system of claim 15, wherein inducing the oscillating motion includes controlling at least one operational parameter to maintain the rotational rate of the drill string between the first operational parameter value and the second operational parameter value.

17. The system of claim 11, wherein monitoring includes estimating an amount of cuttings in the borehole, and inducing includes adjusting one or more of the operational parameters in response to the amount of cuttings.

18. The system of claim 11, wherein inducing includes adjusting one or more of the operational parameters to increase an area of contact between the downhole component and the borehole.

19. The system of claim 11, wherein inducing includes actuating one or more downhole devices to modify a behavior of the drill string and cause the drill string to exhibit the oscillating motion.

20. The system of claim 19, wherein the one or more downhole devices are configured to adjust at least one of an amount of torque applied to the drill string and a rotational rate of the drill string.

* * * * *